A. WELLS.
DEVICE FOR REMOVING THE KERNELS OF CORN.
APPLICATION FILED JUNE 17, 1909.

961,825.

Patented June 21, 1910.

WITNESSES:

INVENTOR
Arthur Wells
BY
ATTORNEYS

UNITED STATES PATENT OFFICE.

ARTHUR WELLS, OF NEW YORK, N. Y.

DEVICE FOR REMOVING THE KERNELS OF CORN.

961,825.  Specification of Letters Patent.  Patented June 21, 1910.

Application filed June 17, 1909. Serial No. 502,760.

*To all whom it may concern:*

Be it known that I, ARTHUR WELLS, a subject of Great Britain, and a resident of the borough of Manhattan, city, county, and State of New York, have invented certain new and useful Improvements in Devices for Removing the Kernels of Corn, of which the following is a specification, accompanied by drawings.

This invention relates to devices for slitting the grains of green corn on the cob and separating the kernels from the skin.

The objects of the invention are to enable the user of the device to slit the grains and to scrape or dig out their contents, as distinguished from a device which merely slits the grains.

My improved device slits or breaks open the grains by means of teeth which also have the function of separating the kernels from the skins, and the device is provided with an additional scraper for insuring the removal of the kernels.

To these ends the invention consists of the device substantially as hereinafter fully described and claimed in this specification and shown in the accompanying drawings, in which—

Figure 1:
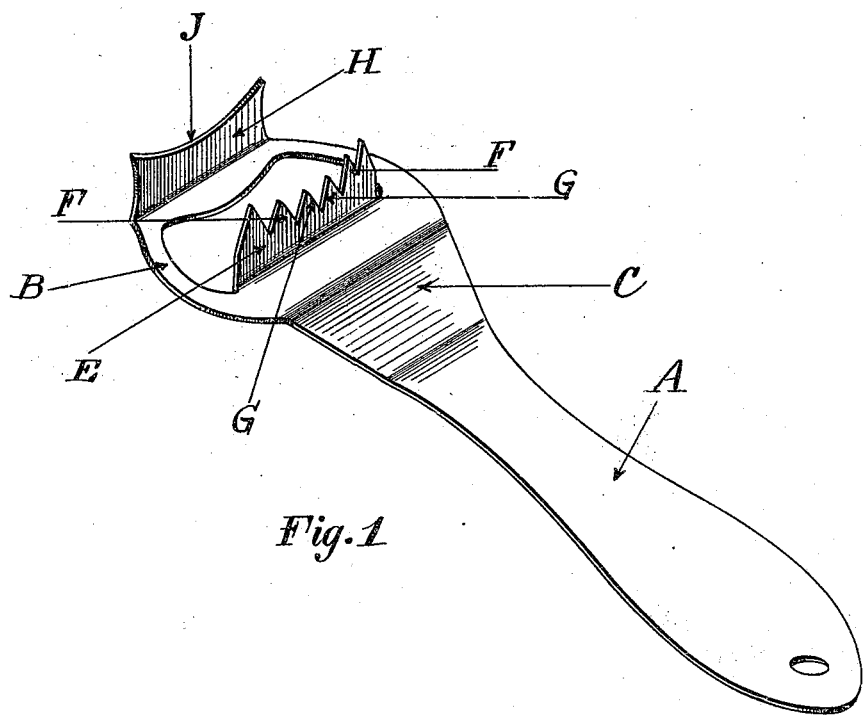
Figure 2:
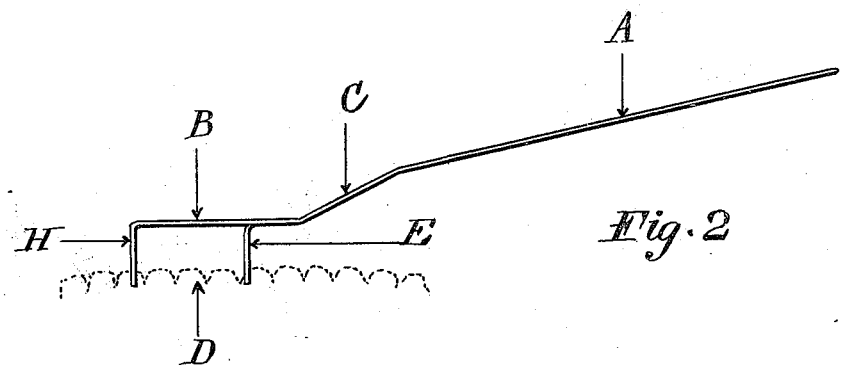

Figure 1 is a perspective view of the device; and Fig. 2 is a side view of the same illustrated in connection with a diagrammatic representation of an ear of corn upon which the device is operating.

The device may be manufactured out of any suitable piece of metal, as for instance, sheet metal, and I prefer to construct the device in one piece having the teeth and the scraper struck up from the metal, but this mode of construction is not essential and the device may be made in any suitable manner.

Referring to the drawings, A represents the handle of the device and B the body portion, between which and the handle is a bend C, so that there is sufficient clearance between the handle A and the ear of corn D to permit the handle to be grasped by the person using the device.

Near the end of the body portion B is provided a transverse row of teeth E shown in this instance struck up out of the metal and extending outwardly from the body portion, oppositely to the bent portion C of the handle. The planes of the individual teeth F, as shown, lie transversely of the device and the teeth are preferably so graduated that the points or tips form a curve substantially conforming to the circumference of an ear of corn. The slopes G of the teeth lie in substantially longitudinal planes, so that the broad side of the teeth is presented to the direction of movement of the device along the ear of corn. By this construction the grains are not merely slit, but the kernels are dug out or separated from the skins and removed from the cob.

In order to complete the operation and insure the removal of substantially all of the kernels, the device is provided with a scraper H, preferably at the end of the body portion B and lying transversely across the body portion. The curved edge J of the scraper preferably corresponds to the curvature of the ear of corn and the scraper may be of substantially the same height as the row of teeth. The scraper H follows after the teeth in operating the device and serves to supplement the action of the teeth.

According to this invention the kernels of the grains of corn may be quickly and effectually removed for edible and other purposes, and a simple and efficient device is provided for use in the household, although the device may be used wherever found desirable.

I claim and desire to obtain by Letters Patent the following:

A device for slitting the grains of green corn on the cob, and separating the kernels from the skins, constructed out of one piece of metal and comprising a body portion provided with an opening and a transverse row of teeth cut out of the body of the metal and arranged at one side of the opening, the end of the body portion being bent at an angle to form a scraper adjacent the teeth, and a handle extending rearwardly from the body portion.

In testimony whereof I have signed this specification in the presence of two subscribing witnesses.

ARTHUR WELLS.

Witnesses:
 FORD J. SHANK,
 ALLAN C. NELSON.